US009329876B2

(12) United States Patent
Chilimbi et al.

(10) Patent No.: US 9,329,876 B2
(45) Date of Patent: May 3, 2016

(54) RESOURCE AWARE PROGRAMMING

(75) Inventors: Trishul A. Chilimbi, Seattle, WA (US); Woongki Baek, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1298 days.

(21) Appl. No.: 12/468,869

(22) Filed: May 20, 2009

(65) Prior Publication Data

US 2010/0299662 A1     Nov. 25, 2010

(51) Int. Cl.
*G06F 9/44* (2006.01)
*G06F 9/445* (2006.01)
*G06F 11/34* (2006.01)

(52) U.S. Cl.
CPC ........ *G06F 9/44536* (2013.01); *G06F 11/3409* (2013.01)

(58) Field of Classification Search
USPC ........................................................ 717/170
See application file for complete search history.

(56) References Cited

U.S. PATENT DOCUMENTS

| 5,471,596 | A | * | 11/1995 | Brown, III | |
|---|---|---|---|---|---|
| 5,557,557 | A | | 9/1996 | Frantz et al. | |
| 5,805,887 | A | * | 9/1998 | Wang | G06F 8/437 |
| | | | | | 712/E9.084 |
| 6,728,690 | B1 | * | 4/2004 | Meek | G06K 9/6281 |
| | | | | | 706/12 |
| 7,493,607 | B2 | | 2/2009 | Moritz | |
| 7,860,299 | B2 | * | 12/2010 | Chaperon | 382/154 |
| 2002/0143556 | A1 | * | 10/2002 | Kadatch | 704/500 |
| 2003/0014742 | A1 | | 1/2003 | Seth et al. | |
| 2003/0046396 | A1 | * | 3/2003 | Richter et al. | 709/226 |
| 2004/0093319 | A1 | * | 5/2004 | Ogasawara | G06F 8/4441 |
| 2005/0114850 | A1 | | 5/2005 | Chheda et al. | |
| 2005/0114860 | A1 | * | 5/2005 | Lin et al. | 718/100 |
| 2006/0020934 | A1 | * | 1/2006 | Naono et al. | 717/154 |
| 2006/0149576 | A1 | * | 7/2006 | Ernest et al. | 705/1 |
| 2006/0155415 | A1 | | 7/2006 | Lefurgy et al. | |
| 2007/0156265 | A1 | * | 7/2007 | McCoy et al. | 700/83 |
| 2009/0018833 | A1 | * | 1/2009 | Kozat et al. | 704/257 |
| 2009/0077351 | A1 | | 3/2009 | Nakaike et al. | |
| 2009/0228690 | A1 | * | 9/2009 | Muff et al. | 712/219 |
| 2010/0125836 | A1 | * | 5/2010 | Sazegari et al. | 717/151 |
| 2010/0169398 | A1 | * | 7/2010 | Kopp | 708/209 |

OTHER PUBLICATIONS

McKinley, Philip K., et al. "Composing adaptive software." Computer 7 (2004): pp. 56-64.*
Salehie, Mazeiar, and Ladan Tahvildari. "Self-adaptive software: Landscape and research challenges." ACM Transactions on Autonomous and Adaptive Systems (TAAS) 4.2 (2009).*
Barroso, L.; "Warehouse-scale computers"; invited talk at the USENIX Annual Technical Conference; Santa Clara, CA; Jun. 2007; published by Morgan & Claypool Publishers 2009; 108 pages.

(Continued)

*Primary Examiner* — Chameli Das
*Assistant Examiner* — Joanne Macasiano
(74) *Attorney, Agent, or Firm* — Alin Corie; Sandy Swain; Micky Minhas (57) ABSTRACT

The described implementations relate to resource aware programming. In one case a program is obtained that is configured to perform a task in accordance with one or more quantitative metrics. An approximate version can be generated from the program. The approximate version is configured to perform the task in a manner that satisfies the one or more quantitative metrics while using fewer computer resources than the program.

20 Claims, 5 Drawing Sheets

(56) References Cited

OTHER PUBLICATIONS

Baek, et al.; "Green: A System for Supporting Energy-Conscious Programming Using Principled Approximation"; Technical Report TR-2009-089; Microsoft Research; Aug. 2009; 14 pages.

Katz, R.; "Research Directions in Internet-scale Computing"; Manweek, 3$^{rd}$ International Week on Management of Networks and Services; San Jose, CA; Oct. 29, 2007; 40 pages.

"Phoenix Academic Program"; downloaded from http://research.microsoft.com/en-us/collaboration/focus/cs/phoenix_booklet_0625_ebook.pdf; Jul. 2007; 44 pages.

Saputra, et al., "Energy Conscious Compilation Based on Voltage Scaling", retrieved at <<http://www.cs.ucla.edu/~palsberg/course/cs239/S04/papers/saputra02.pdf>>, Proceedings of LCTES02-SCOPES02, Jun. 19-21, 2002, pp. 10.

"Energy-Efficient Software Guidelines", retrieved at <<http://software.intel.com/en-us/articles/energy-efficient-software-guidelines/>>, Mar. 23, 2009, pp. 7.

Alvarez, et al., "Fuzzy Memoization for Floatingpoint Multimedia Applications", retrieved at <<http://ieeexplore.ieee.org/stamp/stamp.jsp?tp=&isnumber=30887&arnumber=1432675>>, IEEE Transactions on Computers, vol. 54, No. 7, Jul. 2005, pp. 922-927.

Baek, et al., "Towards Soft Optimization Techniques for Parallel Cognitive Applications", retrieved at <<http://portal.acm.org/ft_gateway.cfm?id=1248389&type=pdf&coll=GUIDE&dl=GUIDE&CFID=26827378&CFTOKEN=43839092>>, ACM, Jun. 9-11, 2007, pp. 2.

Breuer, et al., "Defect and Error Tolerance in the Presence of Massive Numbers of Defects", retrieved at <<http://ieeexplore.ieee.org/Xplore/login.jsp?url=http%3A%2F%2Fieeexplore.ieee.org%2Fiel5%2F54%2F28929%2F01302088.pdf&authDecision=-203>>, IEEE Design & Test of Computers, May-Jun. 2004, pp. 216-227.

Colley, et al., "The Fast Fourier Transform and Its Applications", retrieved at <<http://ieeexplore.ieee.org/stamp/stamp.jsp?tp=&isnumber=&arnumber=4320436>>, IEEE Transactions on Education, vol. 12, No. 1, Mar. 1969, pp. 27-34.

Decandia, et al., "Dynamo: Amazon's Highly Available Key-Value Store", retrieved at <<http://s3.amazonaws.com/AllThingsDistributed/sosp/amazon-dynamo-sosp2007.pdf>>, ACM, Oct. 14-17, 2007, pp. 205-220.

Kajiya, James T., "The Rendering Equation", retrieved at <<http://portal.acm.org/ft_gateway.cfm?id=15902&type=pdf&coll=GUIDE&dl=GUIDE&CFID=26840175&CFTOKEN=80273721>>, Dallas, Aug. 18-22, 1986, vol. 20, No. 4, pp. 143-150.

Kianzad, et al., "Multiprocessor Clustering for Embedded Systems", retrieved at <<http://citeseerx.ist.psu.edu/viewdoc/download?doi=10.1.1.22.5720&rep=rep1&type=pdf>>, Proceedings of the European Conference on Parallel Computing, Manchester, United Kingdom, Aug. 2001, pp. 3.

Li, et al., "Exploiting Soft Computing for Increased Fault Tolerance", retrieved at <<http://maggini.eng.umd.edu/pub/faults-ASGI06.pdf>>, Appears in Workshop on Architectural Support for Gigascale Integration, Boston, MA. Jun. 2006, pp. 9.

Li, et al., "Application-Level Correctness and its Impact on Fault Tolerance", retrieved at <<http://maggini.eng.umd.edu/pub/faults-HPCA2007.pdf>>, Appears in Proc. of the 13th Int'l Symp. on High-Performance Computer Architecture, Phoenix, AZ. Feb. 2007, pp. 12.

"Standard Performance Evaluation Corporation", retrieved at <<http://www.specbench.org/>>, Mar. 23, 2009, pp. 2.

Tong, et al., "Reducing Power by Optimizing the Necessary Precision/Range of Floating-Point Arithmetic", retrieved at <<http://ieeexplore.ieee.org/stamp/stamp.jsp?tp=&isnumber=18335&arnumber=845894>>, IEEE Transactions on Very Large Scale Integration (VLSI) Systems, vol. 8, No. 3, Jun. 2000, pp. 273-286.

Bonissone, Piero P., "Soft Computing: The Convergence of Emerging Reasoning Technologies", Journal of Research in Soft Computing, vol. 1, No. 1; Apr. 1997; pp. 6-18.

Ganssle, Jack G., "A Guide to Approximations", The Ganssle Group; Baltimore, MD; 2001; pp. 20.

Kwok, et al., "Benchmarking the Task Graph Scheduling Algorithms", Proceedings First Merged Int'l Parallel Processing Symp./Symp. Parallel and Distributed Processing Conf.; 1998, pp. 531-537.

* cited by examiner

RESOURCE AWARE PROGRAMMING

BACKGROUND

Computers use resources, such as processor cycles, memory and/or electrical energy to perform or accomplish tasks by executing code. In many cases, processing a task does not have a linear relationship to accomplishing the task. For instance, consider a hypothetical scenario where a user enters an internet search query and the task is to generate 100 relevant results. In this example, assume that the first 50% of the processing accomplishes 99% of the task while the remaining 50% of the processing may satisfy the remaining 1%. Stated another way, the first 99 out of the 100 results are the same whether the task is processed 50% or 100%. So, the difference between processing the task to 50% completion and 100% completion can occur at the $100^{th}$ position in the results. In many instances, both scenarios can satisfy the user's expectations. Thus, the second half of the processing utilizes processing resources, including electricity, without significantly enhancing the user's satisfaction with the search results.

SUMMARY

The described implementations relate to resource aware programming. In one case a resource aware programming (RAP) tool obtains an original program that is configured to perform a task in accordance with one or more quantitative metrics. The RAP tool can generate an approximate version of the original program. The approximate version is configured to perform the task in a manner that satisfies the one or more quantitative metrics while using fewer computer resources than the original program.

The term "RAP tool(s)" may refer to device(s), system(s), computer-readable instructions (e.g., one or more computer-readable media having executable instructions), component(s), module(s), and/or methods, among others, as permitted by the context above and throughout the document. In various instances, RAP tools may be implemented as hardware, software, firmware, or a combination thereof. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to resource aware programming. In one case, resource aware programming tools (hereinafter "RAP tools") can be utilized with a program to balance quantitative metrics and resource usage. Briefly, the RAP tools can generate or synthesize a programming solution (i.e., approximation version) for a task that satisfies end-user expectations while consuming fewer resources than the programmer's original program to accomplish the task. Stated another way, executing the approximation version can utilize fewer resources than are (or would have been) utilized to execute the original version.

In some instances, RAP tools can provide a simple and flexible framework that allows programmers to balance quantitative metrics and resource usage in a systematic manner. RAP tools can facilitate program approximation for resource intensive processes, such as functions and loops, among others.

In some implementations, RAP tools function in two phases. In a calibration phase, the RAP tools can build a model of the performance loss produced by an approximation(s). The RAP tool can use this performance loss model in a synthesis phase. In the synthesis phase, the RAP tool can synthesize or generate an approximate version of the original program that can accomplish the task while satisfying a quantitative metric(s).

In some cases, RAP tools can also provide a runtime recalibration mechanism that occasionally monitors runtime behavior and automatically adjusts the approximation to ensure continuing satisfaction of the quantitative metric.

FIRST SYSTEM EXAMPLE

Figure 1:
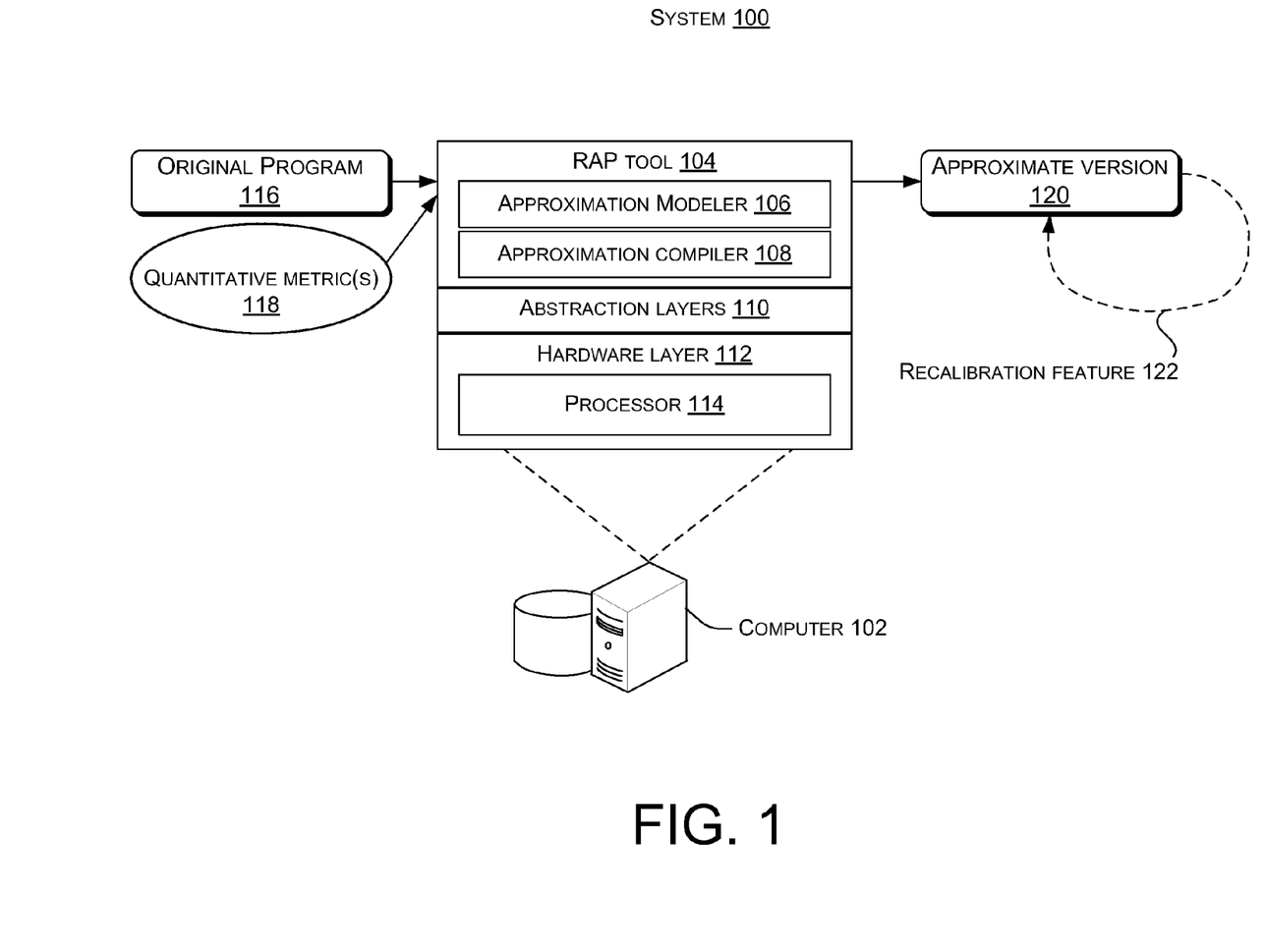
FIGS. 1-2 illustrate examples of systems for accomplishing resource aware programming in accordance with some implementations of the present concepts.

FIG. 1 offers an introductory standalone system 100 that can perform resource-aware programming concepts. In this case, system 100 includes a computer 102. The computer can include a RAP tool 104 that employs an approximation modeler 106 and an approximation compiler 108. RAP tool 104 can operate cooperatively with various abstraction layers 110 and a hardware layer 112 that includes a processor 114. The abstraction layers, hardware layer, and processor are illustrated to orient the reader and are not discussed further herein as the functionality should be recognized by the skilled artisan.

In this case, a user, such as a programmer can write or otherwise obtain a program 116 (hereinafter, "original program") for accomplishing a task. The user can supply the original program 116 and one or more quantitative metrics 118 to RAP tool 104. In some cases, one or more of the quantitative metrics can be supplied by a party other than the programmer. For instance, an end user of the program could supply quantitative metrics.

Many types of quantitative metrics can be utilized in various scenarios. For instance, in one case the quantitative metric(s) 118 can be realized as quality of service (QoS) terms. In another case, the quantitative metric(s) 118 can relate to accuracy to which the task is accomplished. For instance, the accuracy can relate to a specific number of significant digits to which accuracy of the task is guaranteed.

RAP tool 104 can process the original program in consideration of the quantitative metric(s) 118 and output an approximate version 120 of the program. The approximate version can accomplish the task utilizing an approximation that may be less precise than the original program yet satisfies the quantitative metric 118. The approximate version 120 can satisfy the quantitative metric while using fewer resources than the original program 116. Resources can be thought of as any type of computing resource, such as memory usage, processing cycles and/or battery consumption, among others.

In specific instances, the approximation modeler 106 can evaluate various approximations that can be substituted for resource intensive functions or loops of the original program. The various approximations can be thought of as "training data" for the approximation modeler 106. The approximation compiler 108 can generate the approximate version 120 based upon those approximations which utilize relatively fewer resources but which satisfy the quantitative metrics.

In some cases, the RAP tool 104 can offer a recalibration feature or mechanism 122. The recalibration feature can provide run-time refinement of the approximate version to further ensure that the quantitative metrics are satisfied and/or continue to be satisfied.

For purposes of explanation consider a hypothetical scenario where the original program 116 determines the circumference of a circle as the diameter multiplied by π. Further, assume that a user's quantitative metric relates to accuracy to the nearest whole number. The original program can utilize a relatively large amount of processing resources multiplying the diameter by π. However, the approximate version can utilize relatively fewer processing resources to accomplish the task since it can approximate the answer to the nearest whole number by processing only to the nearest tenth and rounding. Yet, the approximate version can still satisfy the user's quantitative metric. Stated another way, when viewed from the user's perspective, both answers are semantically equivalent since they both satisfy the user's expectations.

To summarize, RAP tool 104 can transform the original program 116 to a version (i.e., the approximate version 120) that is semantically equivalent in satisfying the quantitative metric(s). The original program can be thought of as producing a precise answer, whereas the approximate version can produce an approximate answer. However, both the precise answer and the approximate answer can satisfy the user's quantitative metric(s).

There are several application domains where it is acceptable for a program to provide an approximate answer when a relatively high resource cost that would be utilized to provide a precise answer is unavailable or not justified. For example, real-time ray tracing is infeasible on current personal computers (PCs) so games employ a variety of techniques to produce realistic looking lighting and shadows while still rendering at 60 frames per second. Content such as images, music, and movies are compressed and encoded to various degrees that provide a tradeoff between size requirements and fidelity. Such approximations typically result in the program performing a smaller amount of processing and consequently consuming less energy.

Programmers have made ad-hoc attempts to balance resource usage and performance. However, these attempts have offered no way to ensure that quantitative metrics were satisfied. Even in cases where the programmer attempted to quantify the impact, the quantification quickly becomes outdated and inaccurate as the program evolves and/or adds new features and functionality.

In contrast, at least some of the present implementations offer resource savings while providing statistical guarantees that quantitative metrics will be satisfied. The present concepts offer significant resource savings in various programming scenarios involving loop and function processing, among others. For instance, loop and function approximations can offer significant resource savings by approximating expensive loops and functions in programs rather than performing the loops and functions to completion. Implementations of the concepts can achieve the resource savings while satisfying quantitative metrics. For example, a programmer utilizing the RAP tool can specify a maximal quality of service (QoS) loss and the RAP tool can provide statistical guarantees that the approximate version will meet this QoS target.

SECOND SYSTEM EXAMPLE

Figure 2:
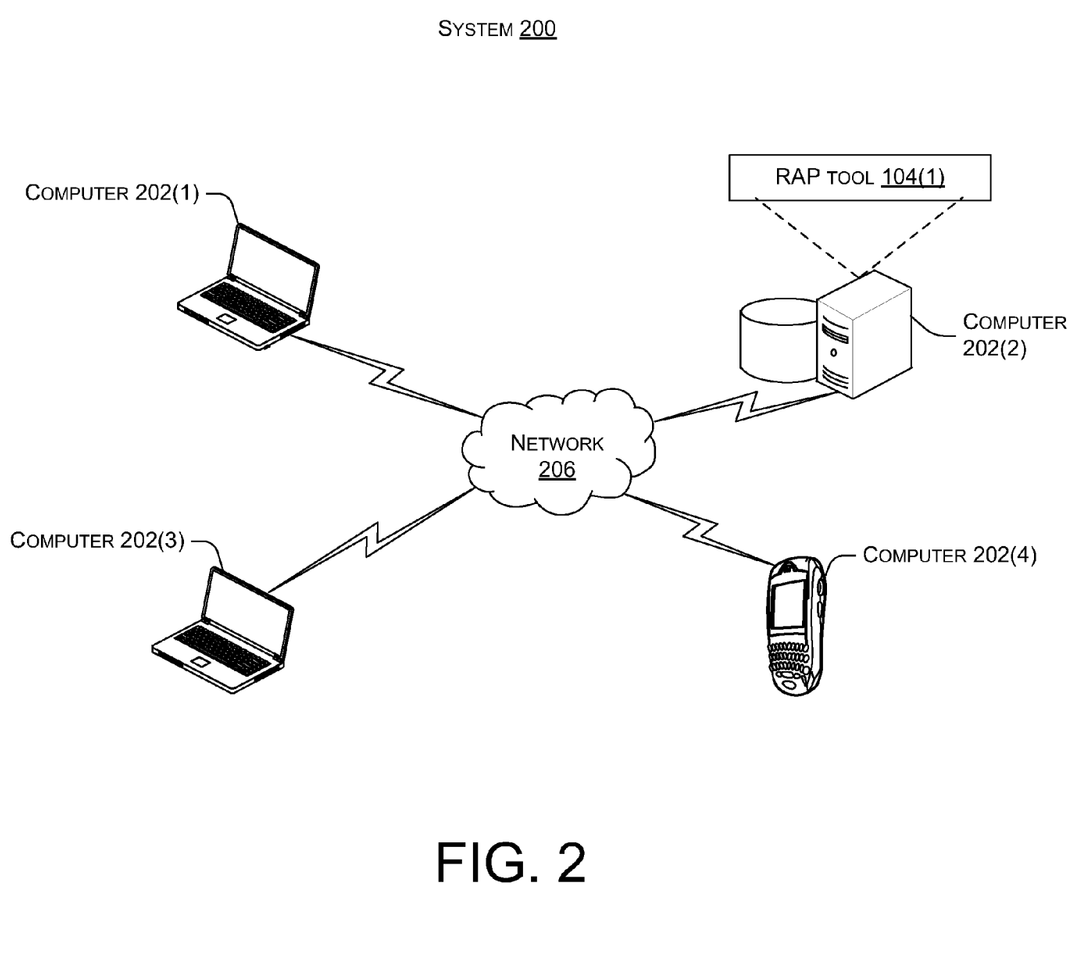

FIG. 2 offers another system 200 that can perform resource-aware programming concepts. In this case, system 200 includes four computers 202(1)-202(4). Here, computers 202(1) and 202(3) are embodied as notebook computers, computer 202(2) is embodied as a server computer, and computer 202(4) is embodied as a smart phone. Computer 202(4) can be representative of an ever-evolving class of devices that, at present includes cell phones, personal digital assistants, and other resource-constrained computers. Computer 202(2) includes a RAP tool 104(1) for accomplishing resource aware programming. Further, the computers 202(1)-202(4) are coupled via a network 206, such as the Internet. In this case, RAP tool 104(1) can operate upon programs developed on other computers via the network 206. In this example, RAP tool 104(1) is stored on server computer 202(2) on computer-readable storage media. Programs can be sent to the server via the network 206 for processing by the RAP tool 104(1). In other implementations, the RAP tool can be downloaded to individual computers 202(1), 202(3)-202(4) for running locally.

For explanation purposes assume that a user, such as a programmer writes an original program on computer 202(1). The user can send the original program to server computer 202(2) (or otherwise into a cloud formed by network 206). The user can also provide quantitative metric(s) associated with the original program. For instance, RAP tool 104(1) can cause a graphical user-interface (GUI) to be generated on the user's computer 202(1). The GUI can allow the user to submit the original program, quantitative metrics and/or training data.

The RAP tool 104(1) can generate an approximate version from the original program that satisfies the quantitative metrics. The approximate version can be returned to the user and made available via a second GUI on computer 202(1). In other instances, the approximate version can be made available over network 206 for use on other computers such as computers 202(3)-202(4). In still other instances, the approximate version may be factory installed on, and/or packaged with, other computers for use by a purchaser.

For example, in one hypothetical case, the user can be a programmer writing an application for smart phone computer 202(4). The programmer sends his/her original program to RAP tool 104(1). The RAP tool generates an approximate version of the application. The approximate version can then be installed on the smart phones at the factory.

The specific types of computers illustrated in FIG. 2 are offered for purposes of example and the concepts are equally applicable to other types of computers. For example, the programmer may be writing an application program for a resource-constrained device that relies on battery power. An approximate version generated by the RAP tool 104(1) can allow the resource constrained device to operate as intended while offering extended operating time on a battery charge. For instance, the approximate version can satisfy design specifications while running relatively fewer processing cycles to accomplish a given task and thereby conserve battery power.

In another scenario, the programmer can be writing the program for a server farm that processes billions of tasks. The approximate version can satisfy quantitative metrics associated with the server farm, such as QoS guarantees with fewer processing cycles, thereby allowing fewer servers to be employed to accomplish a given amount of load and/or reducing electricity consumption utilized to satisfy the load.

FIRST RAP TOOL EXAMPLE

Figure 3:
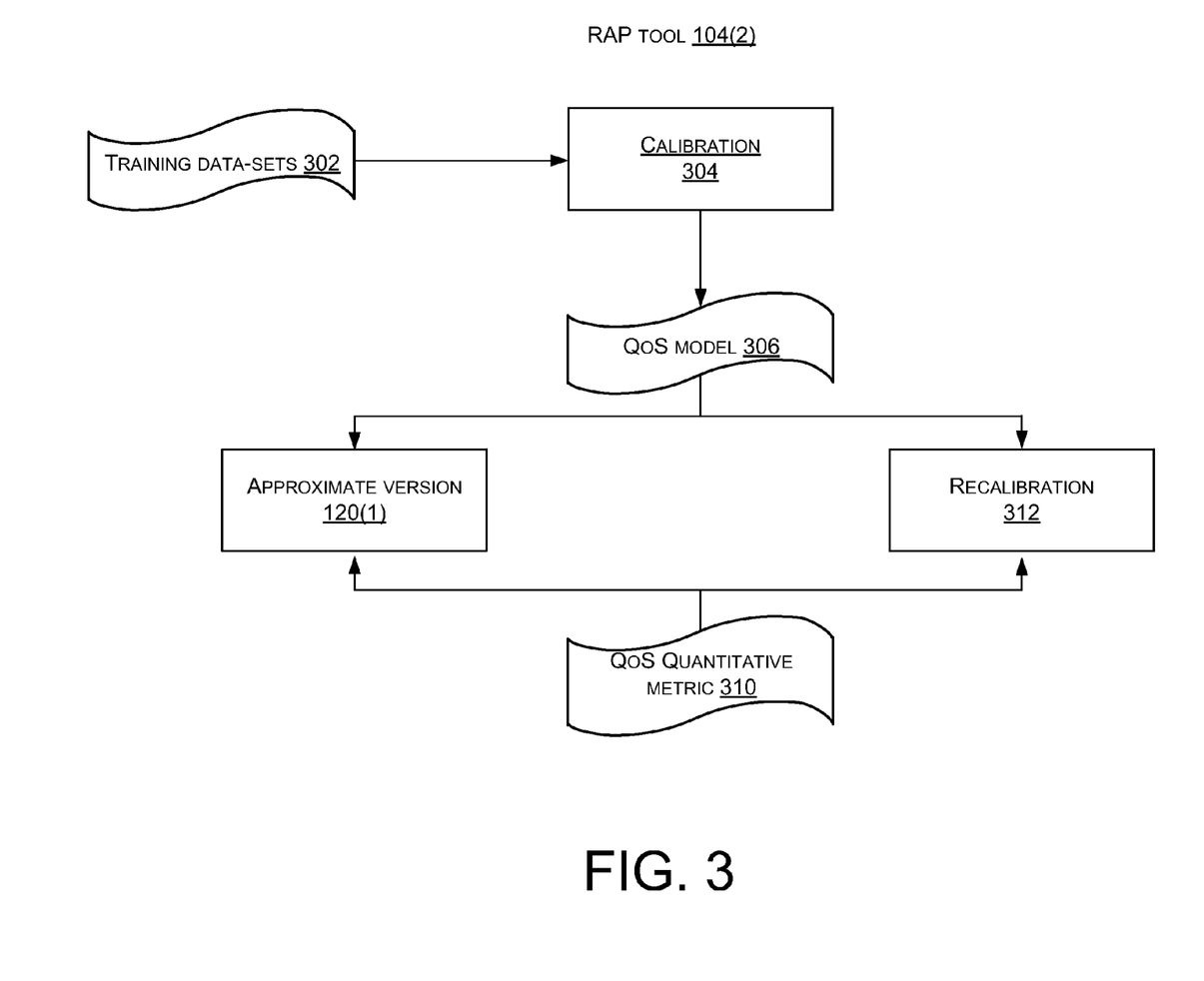
FIGS. 3-4 illustrate examples of resource aware programming tools that can contribute to resource aware programming in accordance with some implementations of the present concepts.

FIG. 3 offers an example of functionality that can be offered by RAP tool 104(2) relative to a program. In this case, RAP tool 104(2) utilizes training data sets 302 in a calibration process or phase 304. In this instance, the training data sets are provided by the programmer who elicits the RAP tool. The training data sets can relate to various approximations associated with a function or loop of the program. The programmer can also supply code to compute a QoS quantitative metric for the program. The calibration phase 304 can run the programmer's original program with the training data sets 302. During the training runs of the calibration phase 304, RAP tool 104(2) can monitor and record the impact of function or loop approximation(s) on the program's QoS and its performance and energy consumption to form a QoS model 306.

Viewed another way, training data sets 302 can include one or more approximations of a function, loop, and/or other aspect of the program. RAP tool 104(2) can use the values returned for the individual approximations as the QoS measure. The RAP tool can compute loss in QoS quantitative metrics by comparing values returned for individual versions against the value returned by the precise function version (i.e. the original program version) given the same input. Loops can be approximated by running fewer loop iterations. Accordingly, the RAP tool can calculate the loss in QoS that arises from early loop termination. This data is used to build a QoS model 306.

The QoS model 306 quantifies the loss in QoS that results from using approximations of the function or loop. The RAP tool 104(2) then generates an approximate version 120(1) of the program utilizing the QoS model 306 in conjunction with programmer supplied QoS quantitative metric 310. In this example, QoS quantitative metric 310 can be realized as a service level agreement (SLA). The approximate version 120 (1) can save processing resources by approximating the function or terminating the loop early while still meeting the QoS quantitative metric.

Since any QoS degradation on the actual program inputs may differ from that observed during calibration, some implementations can perform recalibration 312. Recalibration 312 can involve sampling the QoS loss observed at runtime and updating the approximation decision logic to meet the specified QoS quantitative metric 310. In this way, the RAP tool 104(2) can provide statistical guarantees that the specified QoS quantitative metric 310 will be met. Such statistical guarantees are potentially important as companies provide web services with SLAs. For instance, one commonly encountered SLA states that the service will provide a response within 300 ms for 99.9% of its requests for a peak client load of 500 requests per second.

Table 1 shows an example of how RAP tool 104(2) can approximate functions while still attempting to meet specified QoS quantitative metrics 310. Table 2 offers a similar example relating to loops In these examples, the QoS model 306 constructed in the calibration phase 304 is used by QoS Approx( ) to decide whether approximation is appropriate in the current situation as determined by the function input or loop iteration count. Since the QoS degradation on the actual program inputs may differ from that observed during the calibration phase 304, the RAP tool can provide a mechanism to occasionally measure the program's QoS and update the QoS approximation decisions at runtime (i.e., recalibration 312).

TABLE 1

Expensive functions.

if(QoS_Approx(QoS_SLA))
FApprox( );
else
F( );
count++;
If((count%Sample_QoS)==0)
  QoS_ReCalibrate( );

TABLE 2

Expensive loops.

For/while( ){
...;
if(QoS_Approx(QoS_SLA))
break;
}
count++;
If((count%Sample_QoS)==0)
  QoS_ReCalibrate( );

RAP Tool Mechanisms

As described, in these examples, RAP tool 104(2) can utilize a QoS Compute( ) function for computing the program's QoS, a QoS Approx( ) function for determining whether to perform an approximation, and a QoS ReCalibrate( ) function for revisiting approximation decisions at runtime. In addition, as introduced above, the RAP tool can utilize training data-sets 302 to construct the QoS model 306 and the QoS quantitative metric 310.

QoS Calibration and Modeling

The RAP tool's calibration phase (i.e., calibration phase 304) collects the data that is utilized to build the QoS model 306. In the illustrated case of Tables 1-2, the RAP tool's QoS Compute( ) is application dependent. QoS Compute( ) can range from trivial to complex computation. An example at the trivial end of the spectrum can be the case of using the approximated function's return value. An example at the complex end of the spectrum can involve complex computation involving pixel values rendered on the screen. The RAP tool can use this function along with the set of training inputs to construct the QoS model 306. The QoS model relates function inputs in the case of function approximation and loop iteration count in the case of loop approximation to loss in QoS and performance and resource consumption improvements. This QoS model can be used in conjunction with a provided target QoS quantitative metric to make approximation decisions.

QoS Approximation

In this example, QoS Approx( ) comes in two main variations for loop approximations; static and adaptive. In the static variety, the approximation is determined by the QoS model 306 constructed in the calibration phase 304. Here a loop iteration count threshold is determined by the QoS model and the user-specified QoS quantitative metric 310. Once the loop iteration count exceeds this threshold, the approximation breaks out of the loop.

The adaptive variety can be based on the law of diminishing returns. Here the approximation uses the QoS model 306 in conjunction with the QoS quantitative metric 310 to determine appropriate intervals at which to measure change in QoS and the amount of QoS improvement desired to continue iterating the loop. For instance, a desired level of improvement can be predefined and the improvement for each iteration compared to the predefined value. For instance, the predefined level could be 1% such that when a level of improvement of a task drops below 1% for an individual loop iteration, then the looping is stopped.

For function approximation, the QoS model can be used in conjunction with the QoS quantitative metric and an optional function input parameter range to determine which approximate version of the function to use.

QoS Recalibration

The behavior of the approximate version may occasionally differ from that observed on its training inputs and recalibration 312 (i.e., QoS ReCalibration) provides a mechanism to detect and correct for this effect. In the case of loop approximation, when used with static approximation recalibration can update the QoS model 306 and increase the loop iteration count threshold to compensate for higher than expected QoS degradation. Alternatively, the recalibration 312 can decrease this threshold to improve performance and energy consumption when QoS degradation is lower than expected.

Similarly, when used with adaptive approximation recalibration can appropriately change the interval used to measure change in quantitative metrics, such as QoS and/or QoS improvement going forward. For function approximation, recalibration allows RAP tools to switch the approximate version of the function used to one that is more or less precise as determined by the observed QoS loss.

SECOND RAP TOOL EXAMPLE

Figure 4:
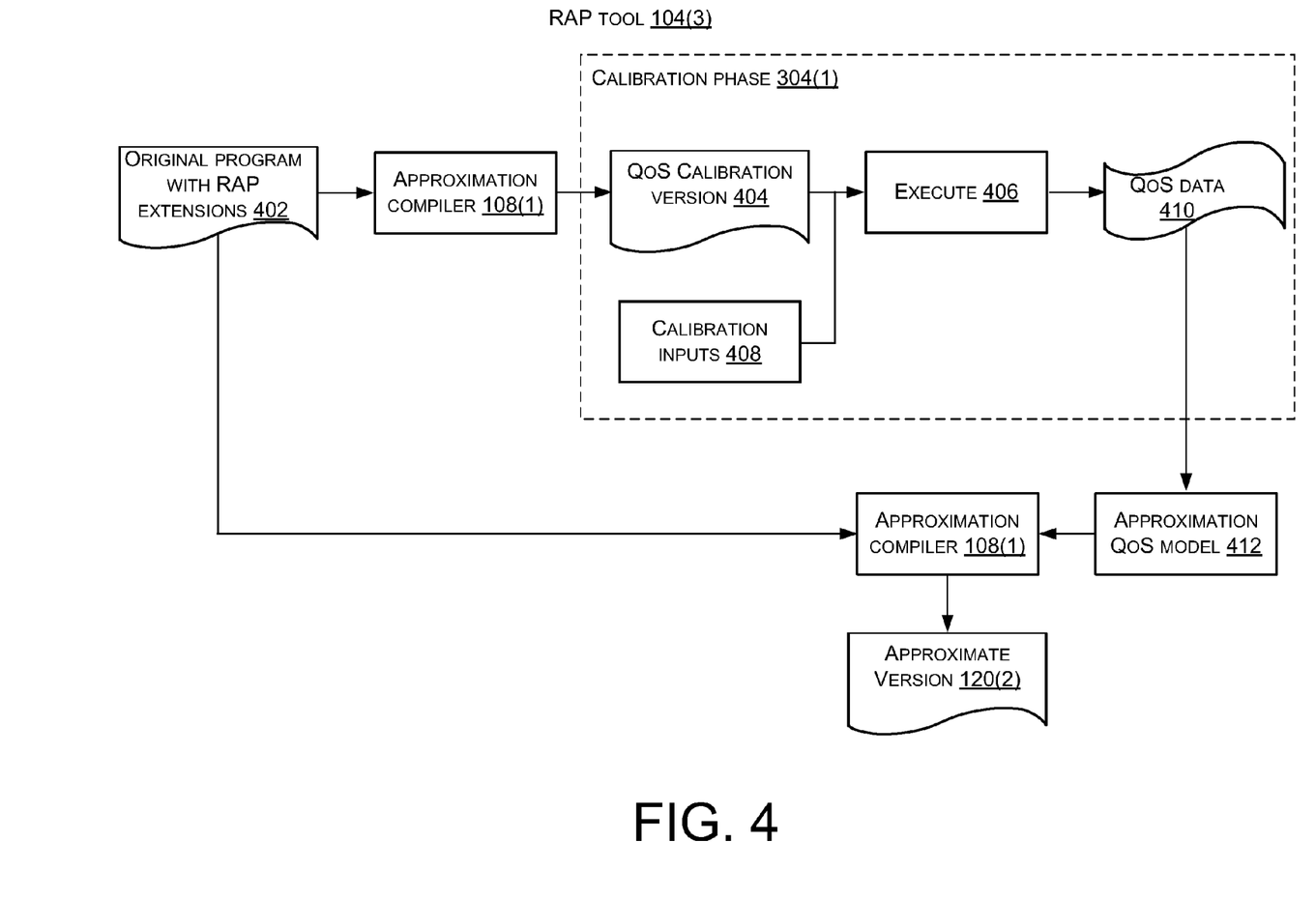

FIG. 4 shows a RAP tool 104(3) that provides a simple and flexible framework for constructing a wide variety of approximation policies. This implementation can provide a minimal and simple interface that satisfies the requirements of the majority of programmers while providing the hooks that allow expert programmers to craft and implement custom, complex policies. To achieve this, RAP tool 104(3) comes with a couple of simple, default policies that meet the needs of many applications and enables them to benefit from using principled QoS (or other quantitative metric) approximation with minimal effort. At the same time, RAP tool 104(3) allows programmers to override these default policies and supply their own policies by writing custom versions of QoS Approximation and QoS ReCalibrate.

In this case, an original program 402 with RAP extensions, which are simple pragmas identifying candidate loops/functions for approximation and the QoS required, is processed by approximation compiler 108(1). The approximation compiler first generates a "QoS calibration" version 404 of the program. In calibration phase 304(1) the QoS calibration version is executed at 406 with user-provided calibration inputs 408 to generate QoS data 410. The QoS data is used to build an approximation QoS model 412. Then the approximation compiler 108(1) uses this constructed approximation QoS model 412 to generate an approximate version 120(2) of the program that can be run in place of the original. The approximation compiler 108(1) synthesizes code to implement QoS Approx( ) and QoS ReCalibrate( ).

RAP Tool Programming Support

Loop Approximation

RAP tool 104(3) supports loop approximation with a new pragma called approx_loop shown in Table 3. The programmer can use the approx_loop pragma just before the target loop and supply a pointer to several inputs. For instance, the programmer can supply inputs including; a user-defined QoS compute function; a calibration granularity (calibrate QoS) for building the loop QoS model; a value of the desired QoS SLA, and indicate if he/she wants to use static or adaptive approximation. In addition, if the programmer wants to avail of runtime recalibration he/she can provide the sampling rate (sample QoS) to perform recalibration. If a programmer wishes to construct a custom policy, he/she can also supply pointers to custom QoS Approximation and/or QoS ReCalibrate routines.

TABLE 3

```
Original Code:
    #approx_loop (*QoS_Compute( ), Calibrate_QoS,
    QoS_SLA, Sample_QoS, static/adaptive)
    loop {
    loop_body;
    }
Approximation code:
    count++;
    recalib=false;
    if (count%Sample_QoS==0) {
    recalib=true;
    }
    loop {
    loop_count++;
    loop_body;
    if (QoS_Approx(loop_count, QoS_SLA, static, recalib)) {
    // Terminate the loop early
    break;
    }
    }
    if(recalib) {
    Qos_loss=QoS_Compute(1, loop_count, 0, ...);
    QoS_ReCalibrate(QoS_loss, QoS_SLA);
    }
Default QoS_ReCalibrate:
    QoS_ReCalibrate(QoS_loss, QoS_SLA) {
    if (QoS_loss>QoS_SLA) {
    // low QoS case
    increase_accuracy( );
    } else if (QoS_loss<0.9*QoS_SLA) {
    // high QoS case
    decrease_accuracy( );
    } else {
    ;// do nothing
    }
    }
Calibration code:
    loop {
    loop_count++;
    loop_body;
    if ((loop_count%Calibrate_QoS)==0) {
    QoS_Compute(0, loop_count, 0, ...);
    }
    }
    QoS_Compute(0, loop_count, 1, ...);
Default QoS_Approx:
    QoS_Approx(loop_count, QoS_SLA, static, recalib) {
    if(recalib) {
    // To perform recalibration we log QoS value
    // and run loop to completion
    if(!stored_approx_QoS) {
    QoS_Compute(0, loop_count, 0, ...);
    stored_approx_QoS = 1;
    }
    return false;
    } else {
    if (static) {
    if (loop_count>M) {
    return true;
```

TABLE 3-continued

```
} else {
return false;
}
} else {
if(loop_count%Period==0)
{
QoS_improve=QoS_Compute(1, loop_count, 0, ...);
if (QoS_improve>Target_delta){
return false;
} else {
return true;
} else {
return false;
}
}
}
```

Function Approximation

For function approximation, RAP tool 104(3) introduces an approximation function keyword. A detailed example of the approximation function keyword is described below in Table 4. The programmer can use approximation function just before the target function implementation and can supply a function pointer array that contains pointers to user-defined approximate versions of that function in increasing order of precision, along with the value of the desired QoS SLA and a sampling rate (sample QoS) if recalibration is utilized. If the function return value does not provide the desired QoS quantitative metric, the programmer supplies a pointer to a custom QoS compute function. A custom input range for function argument values can also be provided to override the default of <-Inf,+Inf>. If the function takes multiple arguments, the RAP tool utilizes the programmer supplied parameter positions of the arguments that can be used while building the QoS model. As with approximation loop, the rest of the arguments are optional and are generally only utilized for custom policies.

TABLE 4

```
Original Code:
  #approx_function (...(*Fapprox[n])(...), QoS_SLA,
  Sample_QoS)
  ... F (...) {
  ...;
  }
Approximation Code:
  if (++count%Sample_QoS==0) {
  recalib=true;
  }
  if (QoS_Approx( )) {
  ... = (*Fapprox[M])(...);
  if(recalib) {
  QoS_funcM = ...;
  QoS_precise = F(...);
  QoS_loss = 100*(abs(QoS_precise−
  QoS_funcM)/QoS_precise);
  QoS_ReCalibrate(QoS_loss, QoS_SLA);
  }
  } else {
  ... = F(...);
  }
Default QoS Approx:
  QoS_Approx( ) {
  return approx_func;
  }
Calibration code:
  foreach approx func {
  QoS_func[i] = (*Fapprox[i])(...);
  }
  QoS_precise = F(...);
  for i = 0..(n−1) {
  store(..., i, 100*(QoS_precise−
```

TABLE 4-continued

```
  QoS_func[i])/QoS_precise);
Default QoS Recalibration:
  QoS_ReCalibrate(QoS_loss, QoS_SLA){
  if (QoS_loss>QoS_SLA) {
  // low QoS case
  if(++M >= n) {
  M−−;
  approx_func = false;
  }
  } else if (QoS_loss<0.9*QoS_SLA) {
  // high QoS case
  if(−−M < 0) {
  M = 0;
  approx_func = true;
  }
  } else {
  ;// do nothing
  }
  recalib = false;
  }
```

Loop Approximation

Table 3 (above) shows pseudo-code generated by the approximation compiler from the original code with the approx loop keyword. The programmer-supplied QoS Compute( ) function is used in the calibration phase to tabulate the loss in QoS resulting from early loop termination at loop iteration counts specified by Calibrate QoS. In this implementation, the QoS Compute( ) function has the following interface: QoS Compute (return QoS, loop count, calibrate, Calibrate QoS, . . . ) and the search application's version is shown in Table 5. Note that when QoS Compute( ) is called with return QoS unset it stores the QoS computed at that point and returns QoS loss when this flag is set. Then, QoS Compute( ) compares the current QoS against the stored QoS to return the QoS loss. When QoS Compute( ) is called with the calibrate flag set at the end of the loop in calibration mode, it computes and stores the % QoS loss when the loop terminates early at loop iteration counts specified by Calibrate QoS.

This calibration data is then used by the RAP tool's QoS modeling routine that is implemented as a MATLAB program. (MATLAB is a numerical computing environment and programming language). The RAP tool's QoS modeling routine supports the following interface for loops.

M=QoS Model Loop(QoS SLA, static) and <Period,Target Delta>=QoS Model Loop(QoS SLA,adaptive). For static approximation the QoS model supplies the loop iteration count that is used by QoS Approx( ) for early loop termination. In the adaptive approximation case, the QoS model determines the period and target QoS improvement used to continue iterating the loop. The synthesized QoS Approx( ) code shown uses the parameters generated by the QoS model to perform approximation. When the approximation is being re-calibrated, QoS Approx( ) stores the QoS value that would have been generated with early loop termination and continues running the loop as many times as the original (precise) program version would have, in order to compute the QoS loss.

The QoS ReCalibrate( ) code generated by the RAP tool compares this QoS loss against the target QoS SLA and either decreases/increases the approximation by either increasing/decreasing the value M of the early termination loop iteration count (static approximation) or decreasing/increasing the value of Target Delta (adaptive approximation).

TABLE 5

QoS_Compute for GMY Search (where GMY represents a relatively standardized search, such as Offered by Google, Microsoft Corp or Yahoo):

```
QoS_Compute(return_QoS, loop_count calibrate,
calibrateQoS)
{
if(!calibrate)
{
if(!return_QoS) {
Store_top_N_docs(loop_count);
return −1;
} else {
if(Same_docs(Get_top_N_docs(loop_count),
Current_top_N_docs( )) {
return 0;
} else {
return 1;
}
}
} else {
...;
}
```

TABLE 6

Customized QoS_ReCalibrate for GMY Search:

```
QoS_ReCalibrate(QoS_loss, QoS_SLA) {
// n_m: number of monitored queries
// n_l: number of low QoS queries in monitored queries
if (n_m==0) {
// Set Sample_QoS to 1 to trigger QoS_ReCalibrate
// for the next 100 consecutive queries
Saved_Sample_QoS=Sample_QoS;
Sample_QoS=1;
}
n_m++;
if (QoS_loss !=0) {
n_l++;
}
if (n_m==100) {
QoS_loss=n_l/n_m;
if(QoS_loss>QoS_SLA) {
// low QoS case
increase_accuracy( );
} else if (QoS_loss < 0.9*QoS_SLA) {
// high QoS case
decrease_accuracy( );
} else {
; // no change
}
Sample_QoS=Saved_Sample_QoS;
}
}
```

Function Approximation

Table 3, introduced above, shows pseudo-code generated by the approximation compiler for function approximation specified using the approximate function (approx funct) keyword. By default, the RAP tool uses the function return value to compute QoS unless the programmer defines a separate QoS Compute( ) function. In the default case, the RAP tool also assumes the function is pure without any side-effects. For calibration, the RAP tool can generate code shown that computes and stores the loss in precision that results from using the family of approximation functions at each call site of the function selected for approximation.

RAP tool modeling routines use this data and support the following interface for functions: <M, approx func>=QoS Model Function (QoS SLA, optional input argument range) where the RAP tool returns the approximate function version whose worst-case QoS loss satisfies the specified target QoS SLA (within the optional function input argument range, if specified). In the event that none of the approximate function versions meet the QoS requirement, approximate function is set to false.

The generated QoS Approx( ) function for the default case is trivial and returns the value of the approximate function. The RAP tool's QoS ReCalibrate( ) function replaces the current approximate function version with a more precise one, if available, to address low QoS, and uses a more approximate version to address higher than desired QoS.

Custom Approximation

RAP tools can allow programmers to override its default synthesis of QoS Approx( ) and QoS ReCalibrate( ) to implement custom approximation policies. Table 6 shows an example of a custom QoS ReCalibrate( ) that can be used for the Search application. For Search, QoS Compute( ) returns a QoS loss of 1 (100%) if the top N documents returned by the precise (i.e., original program) and approximate version do not exactly match and a QoS loss of 0 otherwise. To perform recalibration and compare against a target QoS SLA that is of the form, "the application returns identical results for 99% of the queries", the RAP tool measures the QoS loss across multiple queries as implemented in the code shown in Table 5. The calibration and QoS Approx( ) code is the same as the default code synthesized by the RAP tool.

In summary, RAP tools can support resource aware programming using principled approximation for expensive loops and functions, among others. RAP tools can generate a calibration version of the program that it executes to construct a QoS model that quantifies the impact of the approximation. Next, the RAP tool can use this QoS model to synthesize an approximate version of the program that attempts to meet a user-specified QoS target. The RAP tool can also provide a runtime recalibration mechanism to adjust the approximation decision logic to meet the QoS target.

METHOD EXAMPLES

Figure 5:
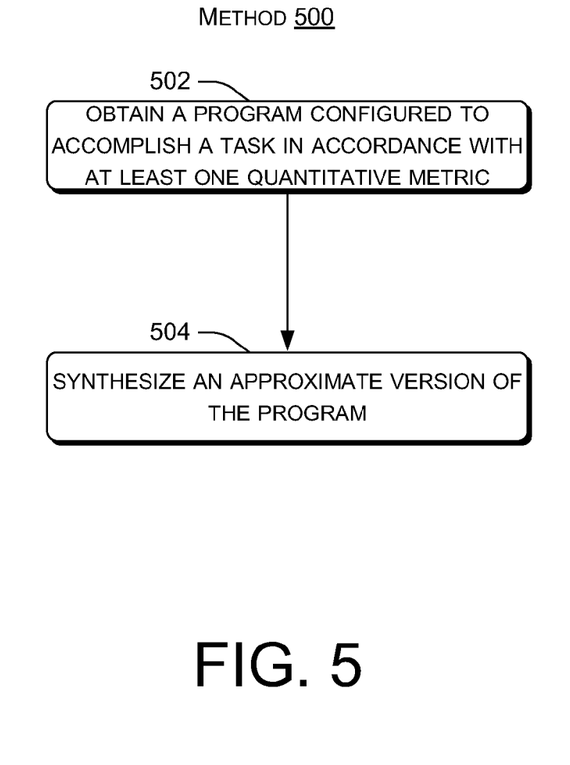
FIG. 5 is a flowchart for implementing resource aware programming in accordance with some implementations of the present concepts.

FIG. 5 shows a flowchart of a filtered index recommendation method or technique 500 that is consistent with at least some implementations of the present concepts. The order in which the method 500 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 502 the method obtains a program configured to accomplish a task in accordance with one or more quantitative metrics.

At block 504 the method synthesizes an approximate version of the program. The approximate version can be configured to accomplish the task in a manner that satisfies the quantitative metric(s) while using fewer resources than the program. In one case, the method creates a performance loss model associated with approximating the task. The approximate version can then be synthesized that satisfies the quantitative metric according to the performance loss model.

CONCLUSION

Although techniques, methods, devices, systems, etc., pertaining to resource aware programming are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented by a computer, the method comprising:
    obtaining an original program configured to accomplish a task in satisfaction of a quality of service quantitative metric;
    creating a performance loss model associated with approximating the task, wherein the performance loss model quantifies performance loss relative to the original program when different approximations are used to accomplish the task;
    synthesizing an approximate version of the original program, wherein the approximate version of the original program uses an individual approximation that is selected so that the approximate version of the original program satisfies the quality of service quantitative metric according to the performance loss model while utilizing fewer resources than the original program;
    receiving a sampling rate for recalibrating the approximate version of the original program; and
    at runtime of the approximate version of the original program:
        sampling, at the sampling rate, quality of service provided by the approximate version of the original program;
        making a determination based on the sampled quality of service to recalibrate the approximate version of the original program; and
        recalibrating the approximate version of the original program responsive to the determination, the recalibrating comprising switching from the individual approximation of the original program at runtime to another individual approximation that is relatively less precise than the individual approximation while continuing to satisfy the quality of service quantitative metric.

2. The method of claim 1, wherein the obtaining comprises causing a user-interface to be displayed that allows a user to enter the original program and the quality of service quantitative metric.

3. The method of claim 1, wherein the different approximations comprise different versions of a function of the original program and creating the performance loss model comprises estimating performance loss associated with the different versions of the function of the original program.

4. The method of claim 1, further comprising making the determination based on a statistical inference that the relatively less precise another individual approximation will continue to satisfy the quality of service qualitative metric.

5. The method of claim 1, wherein the recalibrating is performed when the quality of service provided by the approximate version of the original program differs at runtime relative to when the performance loss model is created.

6. The method of claim 1, wherein the individual approximation terminates a loop early relative to the original program and the another individual approximation terminates the loop early relative to the individual approximation.

7. The method of claim 1, wherein the task is a compression task or a rendering task.

8. A system comprising:
    hardware processor; and
    hardware computer-readable storage media storing instructions which, when executed by the hardware processor, cause the hardware processor to:
        obtain an approximate version of a program, wherein the approximate version is configured to accomplish a task in a manner that satisfies at least one quantitative metric, the approximate version of the program including code defining a first version of a function separately from a second version of the function;
        monitor runtime behavior of the approximate version of the program by determining a first quality of service provided by execution of the approximate version of the program with the first version of the function and a second quality of service provided by execution of the approximate version of the program with the second version of the function;
        sample actual quality of service provided by the approximate version of the program to determine when to switch from the first version of the function to the second version of the function; and
        during runtime of the approximate version of the program, switch from the first version of the function to the second version of the function while continuing to satisfy the at least one quantitative metric.

9. The system of claim 8, wherein the instructions further cause the hardware processor to:
    synthesize the approximate version of the program from an original version of the program, wherein the approximate version is configured to accomplish the task while using fewer resources than the original version of the program.

10. The system of claim 9, wherein the instructions further cause the hardware processor to:
    generate a quality of service model identifying losses in precision of the first version of the function and the second version of the function relative to an original version of the function in the original version of the program.

11. The system of claim 8, wherein the first version of the function is identified in the program by a first pointer and the second version of the function is identified in the program by a second pointer, the first pointer and the second pointer identifying different memory locations.

12. The system of claim 8, wherein the instructions further cause the hardware processor to:
    during runtime of the approximate version of the program:
        determine first levels of accuracy provided by the first version of the function and second levels of accuracy provided by the second version of the function, the second levels of accuracy being higher than the first levels of accuracy;
        when the first levels of accuracy satisfy the at least one quantitative metric, execute the first version of the function instead of the second version; and
        when the first levels of accuracy do not satisfy the at least one quantitative metric and the second levels of accuracy do satisfy the at least one quantitative metric, execute the second version of the function instead of the first version.

13. The system of claim 8, wherein the first version of the function and the second version of the function are located at different memory locations in the code.

14. A system, comprising:
a hardware processor; and
hardware computer-readable storage media storing instructions which, when executed by the hardware processor, cause the hardware processor to:
obtain an approximate version of an original program configured to accomplish a task while meeting a specified level of computational precision, the original program including a first version of a loop with a corresponding first number of loop iterations;
during runtime of the approximate version of the original program, perform sampling of actual computational precision provided by executing the approximate version of the program with the first version of the loop with the first number of loop iterations;
based at least on the sampling of the actual computational precision, obtain a model of a relationship between executing fewer than the first number iterations of the loop to loss of computational precision relative to the first version of the loop; and
cause the approximate version of the original program to execute a second version of the loop that terminates early by executing a second number of iterations that is fewer than the first number of iterations, wherein the second version of the loop accomplishes the task at a lower level of computational precision than the first version of the loop and meets the specified level of computational precision.

15. The system of claim 14, wherein the specified level of computational precision comprises a specified number of significant digits of precision that the original program should satisfy when accomplishing the task, the original version of the loop accomplishes the task to a first number of significant digits that is greater than the specified number, and terminating the loop early performs the task to a second number of significant digits that is less than the first number but at least equal to the specified number.

16. The system of claim 14, wherein the instructions further cause the hardware processor to:

identify, from a plurality of loops in the original program, a subset of the plurality of loops having corresponding pragmas identifying the subset of loops as candidates for approximation; and
transform the original program such that the approximate version of the original program terminates multiple loops from the subset early.

17. The system of claim 14, wherein the instructions further cause the hardware processor to:
model the relationship by evaluating an impact of loop iteration count of the loop on the actual precision at which the task is accomplished.

18. The system of claim 17, wherein the instructions further cause the hardware processor to:
determine a loop iteration count threshold based on the impact of loop iteration count on the actual precision at which the task is accomplished; and
configure the approximate version of the original program to break out of the loop when the loop iteration threshold count is exceeded.

19. The system of claim 18, wherein the instructions further cause the hardware processor to:
configure the approximate version of the original program to measure degradation of the actual precision at runtime and recalibrate the loop iteration count threshold to account for the measured degradation of the actual precision.

20. The system of claim 17, wherein the instructions further cause the hardware processor to:
determine a specified level of precision improvement for iterations of the loop; and
configure the approximate version of the original program to continue executing the loop while the iterations of the loop improve the actual precision of the task at least to the specified level of precision improvement and to break out of the loop when an individual loop iteration does not improve the actual precision at the specified level of precision improvement.

* * * * *